United States Patent

Vanha et al.

(10) Patent No.: US 7,154,372 B2
(45) Date of Patent: Dec. 26, 2006

(54) MICROMECHANICAL FLOW SENSOR WITH TENSILE COATING

(75) Inventors: Ralph Steiner Vanha, Zürich (CH); Tommaso Francesco Cliento, Zürich (CH)

(73) Assignee: Sensirion AG (CH)

( * ) Notice: Subject to any disclaimer, the term of this patent is extended or adjusted under 35 U.S.C. 154(b) by 0 days.

(21) Appl. No.: 10/466,026

(22) PCT Filed: Dec. 20, 2001

(86) PCT No.: PCT/IB01/02738

§ 371 (c)(1),
(2), (4) Date: Mar. 19, 2004

(87) PCT Pub. No.: WO02/055967

PCT Pub. Date: Jul. 18, 2002

(65) Prior Publication Data
US 2005/0087024 A1    Apr. 28, 2005

(30) Foreign Application Priority Data
Jan. 10, 2001 (CH) ................................ 0031/01

(51) Int. Cl.
*H01C 10/10* (2006.01)
(52) U.S. Cl. .................. 338/42; 338/22 SD; 338/47
(58) Field of Classification Search ............. 73/204.25, 73/204.26; 338/25, 22 R, 22 SD, 36, 42, 338/47

See application file for complete search history.

(56) References Cited

U.S. PATENT DOCUMENTS

| 4,478,076 | A |   | 10/1984 | Bohrer ........................... 73/204 |
| 4,841,769 | A |   | 6/1989 | Porth et al. ............... 73/204.26 |
| 4,966,037 | A | * | 10/1990 | Sumner et al. ........... 73/204.26 |
| 5,006,421 | A |   | 4/1991 | Yang et al. .................. 428/641 |
| 5,050,439 | A | * | 9/1991 | Thompson ............. 73/861.356 |
| 5,703,287 | A | * | 12/1997 | Treutler et al. ........... 73/204.26 |
| 6,030,709 | A | * | 2/2000 | Jensen et al. ................ 428/446 |
| 6,098,455 | A | * | 8/2000 | Nukui et al. .............. 73/204.26 |
| 6,234,016 | B1 | * | 5/2001 | Bonne et al. ............. 73/204.26 |
| 6,240,777 | B1 | * | 6/2001 | Treutler et al. ........... 73/204.26 |
| 6,250,150 | B1 | * | 6/2001 | Azumi .................... 73/204.26 |
| 2002/0007673 | A1 | * | 1/2002 | Tanimoto et al. ......... 73/204.26 |
| 2002/0011104 | A1 | * | 1/2002 | Yamakawa et al. ....... 73/204.26 |

FOREIGN PATENT DOCUMENTS

WO    WO 0198736    12/2001

OTHER PUBLICATIONS

F. Mayer, Thermal CMOS Anemometers, 1998. Ph.D. Thesis 12741 of the Swiss Federal Institute of Technology Zürich: 37-51.
U. Münch et al., Industrial Fabrication Technology for CMOS Infrared Sensor Arrays 1997, Transducers '97, International conference on Solid State Sensors and Actuators. IEEE1997.
F. Mayer, Thermal CMOS Anemometers, 1998 Ph.D. Thesis 12741 of the Swiss Federal Institute of Technology Zürich: 37-51.

* cited by examiner

*Primary Examiner*—Tu Hoang
(74) *Attorney, Agent, or Firm*—Cooper & Dunham LLP

(57) ABSTRACT

A sensor integrated on a semiconductor device (1), in particular a flow sensor, comprises a measuring element (2) on a membrane (5). In order to prevent a buckling of the membrane (5) a tensile coating (9) is applied. The coating covers the membrane, but it preferably leaves all the active electronic components integrated on the semiconductor chip (1) uncovered, such that their electrical properties are not affected.

16 Claims, 2 Drawing Sheets

MICROMECHANICAL FLOW SENSOR WITH TENSILE COATING

CROSS REFERENCE TO RELATED APPLICATIONS

This application claims the priority of Swiss patent application 0031/01, filed Jan. 10, 2001, the disclosure of which is incorporated herein by reference in its entirety.

BACKGROUND OF THE INVENTION

The invention relates to a sensor as well as to a method of its production.

Sensors of this type are e.g. flow or temperature sensors, where at least a part of the measuring element is arranged on a membrane. This membrane has often a thickness of a few micrometers only and spans an opening or recess in the semiconductor device.

Preferably, further active electronic components are integrated on the semiconductor device of sensors of this type, such as transistors for amplifiers or reference voltage sources.

The membrane is usually formed by the layers deposited during the production of the circuit, wherein the semiconductor below the layers is etched away. The layers that are deposited in most of the conventional production processes, are, however, usually under compressive stress, i.e. pressure forces are acting within the plane of the layer, e.g. because the layers were applied at elevated temperatures and contracted less than the substrate while cooling down. The magnitude of the compressive stress depends on the manufacturing process and on the layer structure of the membrane. This compressive stress can lead to an undesired buckling of the membrane, which renders it mechanically unstable.

SUMMARY OF THE INVENTION

Hence, it is an object to provide a sensor of the type mentioned initially that avoids this problem.

In order to prevent a buckling of the membrane, a tensile coating is applied on the membrane, This coating leaves at least part, preferably all, of the active electronic components integrated on the semiconductor device uncovered. As it has been found, the coating can otherwise lead to a change or degradation of the function of these components because it affects the electronic parameters of the semiconductor. Preferably, all active electronic components are therefore left uncovered by the tensile coating.

The tensile coating covers preferably the whole membrane. In order to exert a pulling force suited for tightening the membrane, it should preferably extend beyond the membrane somewhat at least at two opposite sides.

The invention is especially suited for being applied in integrated flow sensors.

BRIEF DESCRIPTION OF THE DRAWINGS

Further embodiments, advantages and applications of the invention are given in the dependent claims as well as in the now following description making reference to the drawings, wherein:

WAYS TO CARRY OUT THE INVENTION

Figure 1:
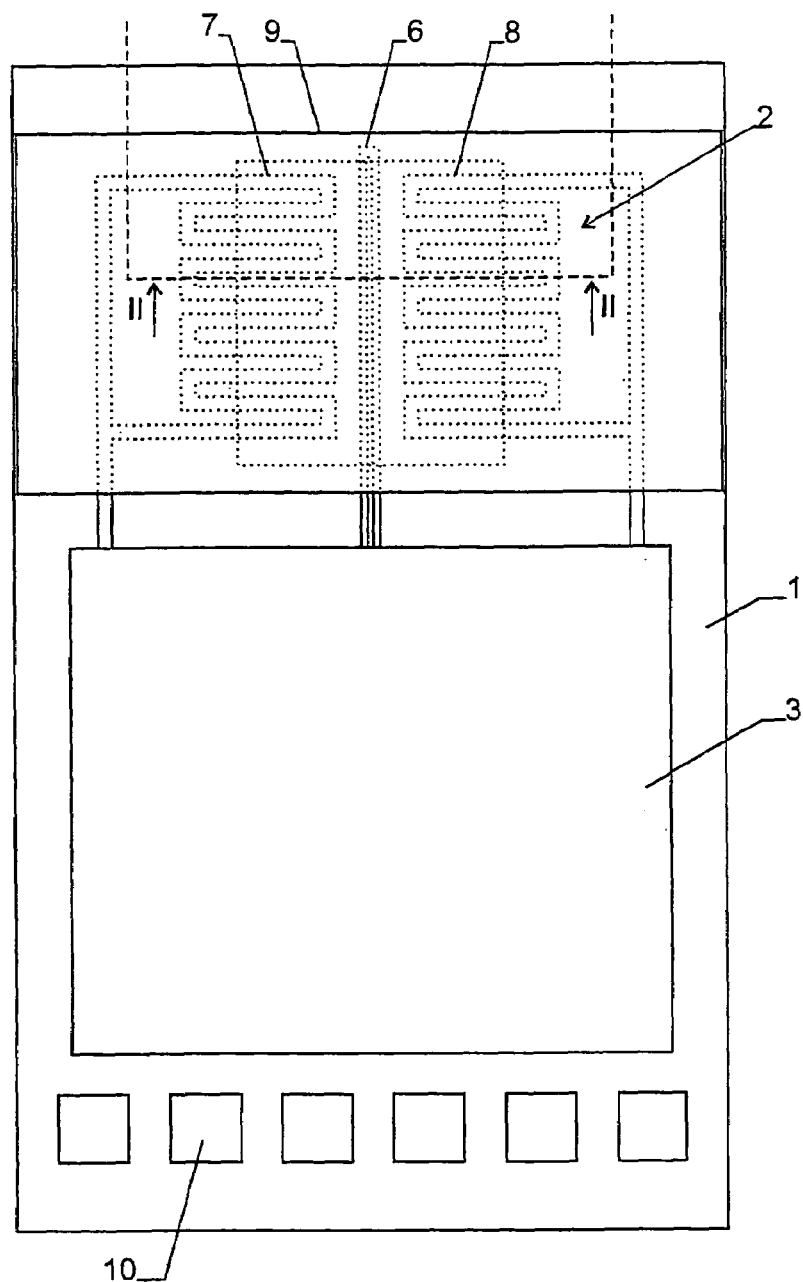
FIG. 1 is a top view of a flow sensor, wherein the components that lie below the tensile coating are shown in dashed lines.
Figure 2:
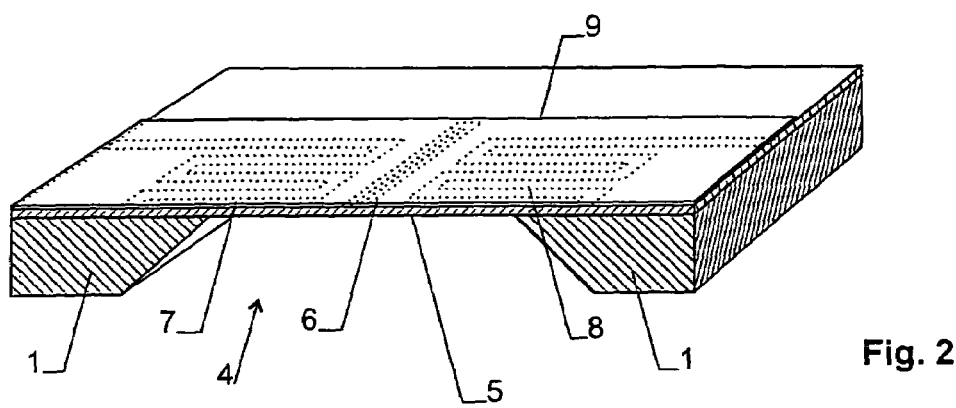
FIG. 2 is a sectional view along line I—I of FIG. 2.

In FIGS. 1 and 2 an embodiment of the invention in the form of a flow sensor is shown. It comprises a semiconductor device 1, onto which a measuring element 2 and a circuit 3 are integrated.

In semiconductor device 1 an opening or recess 4 has been etched out, which is covered by a thin membrane 5.

A heating 6 is arranged on membrane 5. Two meandering thermopiles 7, 8 are provided symmetrically to heating 6, which act as temperature sensors. The orientation of the thermopiles 7, 8 and the heating 6 in respect to the flow direction of the medium to be measured is such that the medium first flows over first thermopile 7, then over heating 6, and finally over second thermopile 8.

The measuring element 2 is covered by a tensile coating 9, which is under tensile stress and extends beyond membrane 5 on all sides or at least on two opposite sides of recess or opening 4. The overlap reaches at least sufficiently far in order to provide anchoring for the tensile coating 9 on semiconductor device 1 for receiving the tension. The tensile stress in tensile coating 9 is at least sufficiently large to exceed a compressive stress in membrane 5, which leads to a total tensile stress. Coating 9 therefore keeps membrane 5 tight and prevents or counteracts a buckling thereof.

Tensile coating 9 can e.g. consist of a silicon oxide, silicon nitride or a polymer, in particular polyimide. Other possible materials are e.g. "Diamond Like Carbon" (DLC), polyether ether ketone (PEEK) or silicon. Silicon nitride has been found to be especially suited.

The tensile stress in coating 9 can be controlled by means of known methods by suitable choice of the manufacturing parameters, see e.g. U. Münch et al., "Industrial Fabrication Technology for CMOS Infrared Sensor Arrays" in "Transducers '97, International conference on Solid State Sensors and Actuators", IEEE 1997, where it is described how, by suitable selection of the low frequency power and the pressure in a PECVD method, the tensile stress of a layer of silicon oxide nitride can be adjusted.

A coating under tensile stress can also be manufactured by applying a coating material with a higher thermal expansion coefficient than silicon at elevated temperature onto semiconductor device 1. When cooling the device down, a tensile coating is generated inevitably.

The tensile stress should be chosen sufficiently large such that it can compensate a possible compressive stress in membrane 5. Preferably, the tensile stress is at least 100 MPa.

Photolithographic methods can be used for structuring or defining the spatial extension of tensile coating 9. A shadow mask can be used as well, or a lift-off technique can be applied, where an additional material layer below coating 9 is dissolved wherever coating 9 is to be removed.

The general principle of operation of measuring element 2 is described in detail in "Scaling of Thermal CMOS Gas Flow Microsensors: Experiment and Simulation" by F. Mayer et al., in Proc. IEEE Micro Electro Mechanical Systems, (IEEE, 1996), pp. 116ff. In particular, the temperatures over the thermopiles 7, 8 are measured for determining the mass flow over the sensor. The difference of these temperatures is a function of the mass flow.

Circuit 3, which can e.g. be implemented in CMOS technology, is provided for the corresponding processing of the signals from the thermopiles 7, 8. It comprises amplifiers, A/D-converters with reference voltage sources, and a digital processing circuit with interface. For connecting circuit 3 with the exterior world, contact pads 10 are provided.

As can be seen from FIG. 1, tensile coating 9 only covers a part of semiconductor device 1, namely the part that is exposed to the medium to be measured. In particular, tensile coating 9 does not extend over circuit 3. Experiments have shown than mechanical stress caused by the tensile coating can affect the electrical parameters of semiconductor device 1, which can e.g. lead to a change of the properties of transistors, reference voltage sources, and other devices, in particular of active components and resistors. By not laying tensile coating 9 over these components, such a degradation can be avoided. This simplifies the manufacturing process because the known electrical parameters of the semiconductor can be used for modelling the circuit.

Due to tensile coating 9 a buckling of the membrane can, as mentioned, be prevented. It also prevents or reduces a bending of membrane 5 if a pressure difference is applied over the same.

In the above example, the invention has been described for a flow detector, but it can also be used in other applications:

A membrane 5 of the type shown in FIG. 2 can also be used in pressure sensors, where a pressure difference to be measured is applied over the membrane. In this case, tensile coating 9 can also be used for changing the sensitivity of the sensor. The higher the tensile stress and the elastic modulus in coating 9, the lower the sensitivity becomes.

Further, the tensile coating 9 can be used for other types of sensors where a membrane of the type of FIG. 2 is used, e.g. for infrared sensors.

The tensile coating 9 can even be an active part of the sensor. Thus, it may consist of a material the dielectric or electric properties of which vary depending on a parameter to be measured. In a humidity sensor, a polymeric tensile coating, the dielectric constant or conductivity of which varies depending on current humidity, may e.g. be used. In a substance detector, tensile coating 9 can e.g. undergo chemical reactions with the substance to be measured, or its chemical potential or work function can change. Also the optical properties of the tensile coating can depend on a parameter to be measured.

The tensile coating 9 can also have further functions. For example, it can in particular form an insulating layer that separates the components arranged on the membrane from the medium to be measured. It can e.g. serve as a passivation that prevents a damage of the components by acids or water.

The layers of membrane 5 can be layers that are a result of the process for manufacturing circuit 3. Therefore, the mechanical properties, and in particular the tensility of these layers cannot be chosen freely. The additional tensile coating 9 allows it, however, to keep membrane 5 taut and to control its flexing properties independently from the used process.

In the above described example the tensile coating is lying over membrane 5 as well as on the components arranged on the membrane. It can, however, also be arranged below membrane 5 or as a layer within membrane 5.

In addition, electronic semiconductor components are often provided with a protective layer. This protective layer consists preferably of silicon nitride ($Si_3N_4$) and serves, in particular, for protecting the topmost metal layer from corrosion. In order to make the protective layer as tight as possible, it is, as a rule, compressive, i.e. it is under a compressive stress parallel to the semiconductor surface. In normal CMOS manufacturing processes it is applied to the device in a last step and covers the same substantially completely, with the exception of the contact pads 10.

Such a protective layer can counteract the effect of tensile layer 9. Hence, it is preferably structured such that it, at least, does not extend over membrane 5. For this purpose, it can be left away in a region of membrane 5 or it can be removed before applying the tensile coating.

Figure 3:
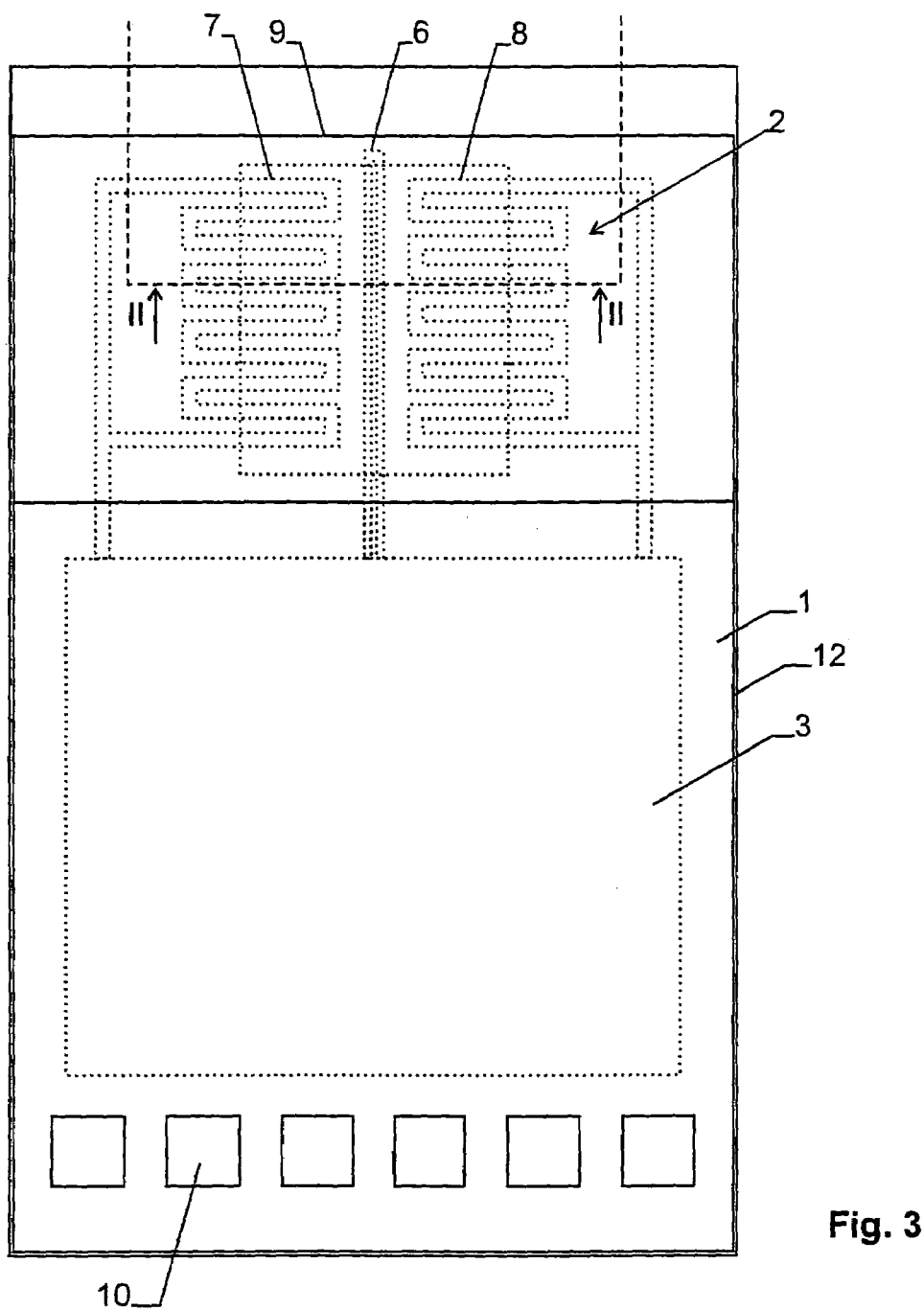
FIG. 3 is a top view of the flow sensor where an additinoal protective layer is shown in addition to the tensile coating.

A corresponding sensor is shown in FIG. 3. It comprises a protective layer 12, which is under compressive stress and covers and protects at least circuit 3.

The protective effect of protective layer 12 is, in general, better than the one of tensile coating 9 because the latter can tend to form holes and fractures because of its inherent tensile stress. Therefore, tensile coating 9 should not be applied directly on a metal layer (which corrodes easily).

Figures 4, 5:
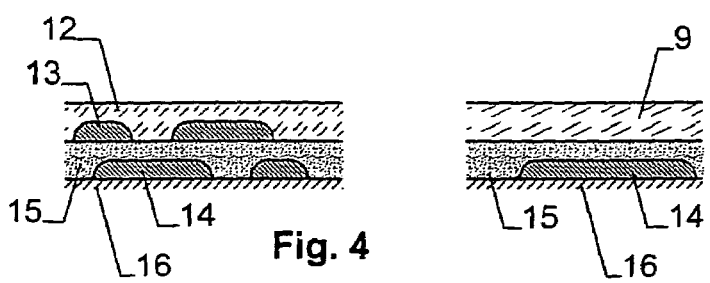
FIG. 4 is an example of a structure in a region of the protective layer and FIG. 5 is an example of a structure in a region of the tensile coating.

As a rule, several metal layers are provided in normal CMOS devices, as it is shown in FIG. 4. In this example, the topmost metal layer 13 is covered by protective coating 12 and separated from the next to top metal layer 14 by means of a silicon oxide layer 15. Below the lower metal layer 14, further layers 16 may follow.

If protective layer 12 is replaced by tensile coating 9, topmost metal layer 13 should be omitted, as it is shown in FIG. 5. Hence, in the present case, no structures of topmost metal layer 13 should be provided in the area of coating 9. This ensures that, in the area of coating 9, all metal structures are protected by silicon oxide layer 15. Silicon oxide layer 15 therefore forms a separating layer between coating 9 and the metal structures of the device and protects the same from environmental influence.

As mentioned above, protective layer 12 can be omitted in the area of membrane 5 or it can be removed prior to applying tensile coating 9. In the latter case, protective layer 9 has to be etched off in the area of membrane 5. During this, it should, however, be avoided that silicon oxide layer 15, by means of which the structures of lower metal layer 14 are to be protected, is damaged.

As there are hardly any etching processes with a good selectivity between silicon oxide and silicon nitride, topmost metal layer 13 is preferably used as an etching stop when etching off protective layer 12. For this purpose, the latter is structured to extend over the whole membrane 5. Then the device is provided with coating 12. Now, coating 12 can be etched off in the area of the membrane by means of a first etching agent, wherein topmost metal layer 13 protects the next lower silicon nitride layer 15. Then topmost metal layer 13 can be removed in the area of membrane 5 by a metal specific second etching agent, again without impairing silicon oxide layer 14. Finally, coating 9 is applied to silicon oxide layer 14.

The rule according to which coating 9 should not lie directly on a metal structure must also be observed in the area of so-called "scribe lines". These are diffusion barriers that are formed by omitting, in an area, all layers with the exception of the metal layers. If a scribe line is arranged below coating 9, silicon layer 15 should be left over the scribe line.

While the present application describes preferred embodiments of the invention, it is to be distinctly pointed out that The invention is not limited thereto and can also be carried out in different manner within the scope of the following claims.

The invention claimed is:

1. A sensor with a semiconductor device, on which a measuring element and a circuit with active electronic components are integrated, wherein the measuring element is arranged on a membrane above an opening or recess of the semiconductor device, wherein a tensile coating is arranged on the semiconductor device for tautening the membrane, wherein the tensile coating covers said measuring element but leaves at least a part of the active components of the circuit uncovered.

2. The sensor of claim 1 wherein the tensile coating leaves at least the active electronic components of the circuit uncovered.

3. The sensor of claim 1 wherein the tensile coating extends over the membrane.

4. The sensor of claim 1 wherein the active electronic components of the circuit comprise transistors.

5. The sensor of claim 1 wherein the circuit is designed for processing signals of the measuring element.

6. The sensor of claim 1 wherein the tensile coating extends beyond the membrane on at least two opposite sides.

7. The sensor of claim 1 wherein the tensile stress of the coating is at least 100 MPa.

8. The sensor of claim 1 comprising circuit parts arranged on the membrane and wherein the tensile coating is arranged on the membrane and on the circuit parts.

9. The sensor of claim 1 comprising a protective layer for protecting the electronic components, wherein the protective layer is under compressive stress and wherein the protective layer does not extend over the membrane.

10. The sensor of claim 9 wherein the protective layer and the tensile coating are of silicon nitride.

11. The sensor of claim 1 wherein metallic structures are arranged on the semiconductor device and wherein the tensile coating is separated from the metallic structures by at least one separating layer.

12. Sensor of claim 1 wherein the circuit is designed for processing signals of the measuring element and not covered by the tensile coating.

13. Sensor of claim 1 wherein the tensile coating extends beyond all sides of the membrane.

14. Sensor of claim 1 wherein metallic structures are arranged on the semiconductor device and wherein the tensile coating is separated from the metallic structures by at least one separating layer of silicon oxide.

15. A flow sensor comprising
a semiconductor device with a recess or opening therein,
a membrane above the recess or opening,
a measuring element integrated on the semiconductor device, and arranged on the membrane
a circuit with active electronic components integrated on the semiconductor device,
a tensile coating for tautening the membrane, wherein the tensile coating extends over the membrane but does not extend to said active electronic components.

16. A sensor comprising
a semiconductor device with a recess or opening therein,
a membrane above the recess or opening,
a measuring element integrated on the semiconductor device, and arranged on the membrane
a circuit with active electronic components integrated on the semiconductor device,
a tensile coating for tautening the membrane, wherein the tensile coating extends over the membrane but does not extend to said active electronic components.

* * * * *

UNITED STATES PATENT AND TRADEMARK OFFICE
CERTIFICATE OF CORRECTION

| | | |
|---|---|---|
| PATENT NO. | : 7,154,372 B2 | Page 1 of 1 |
| APPLICATION NO. | : 10/466026 | |
| DATED | : December 26, 2006 | |
| INVENTOR(S) | : Ralph Steiner Vahna and Tommaso Francesco Cliento | |

It is certified that error appears in the above-identified patent and that said Letters Patent is hereby corrected as shown below:

Title Page, Item (75) Inventors:

The spelling of the second named inventor's last name in the Inventor section on the cover page of the patent, should read as follows:

--(75) Inventors: "Ralph Steiner Vanha, Zürich (CH); Tommaso Francesco Cilento, Zürich (CH)"--

Signed and Sealed this

Seventeenth Day of April, 2007

JON W. DUDAS
*Director of the United States Patent and Trademark Office*